C. A. GUSTAVSON & H. C. KARLSON.
COMBINED ROTATING AND RECIPROCABLE TOOL.
APPLICATION FILED JUNE 14, 1909.
994,386.
Patented June 6, 1911.
3 SHEETS—SHEET 3.
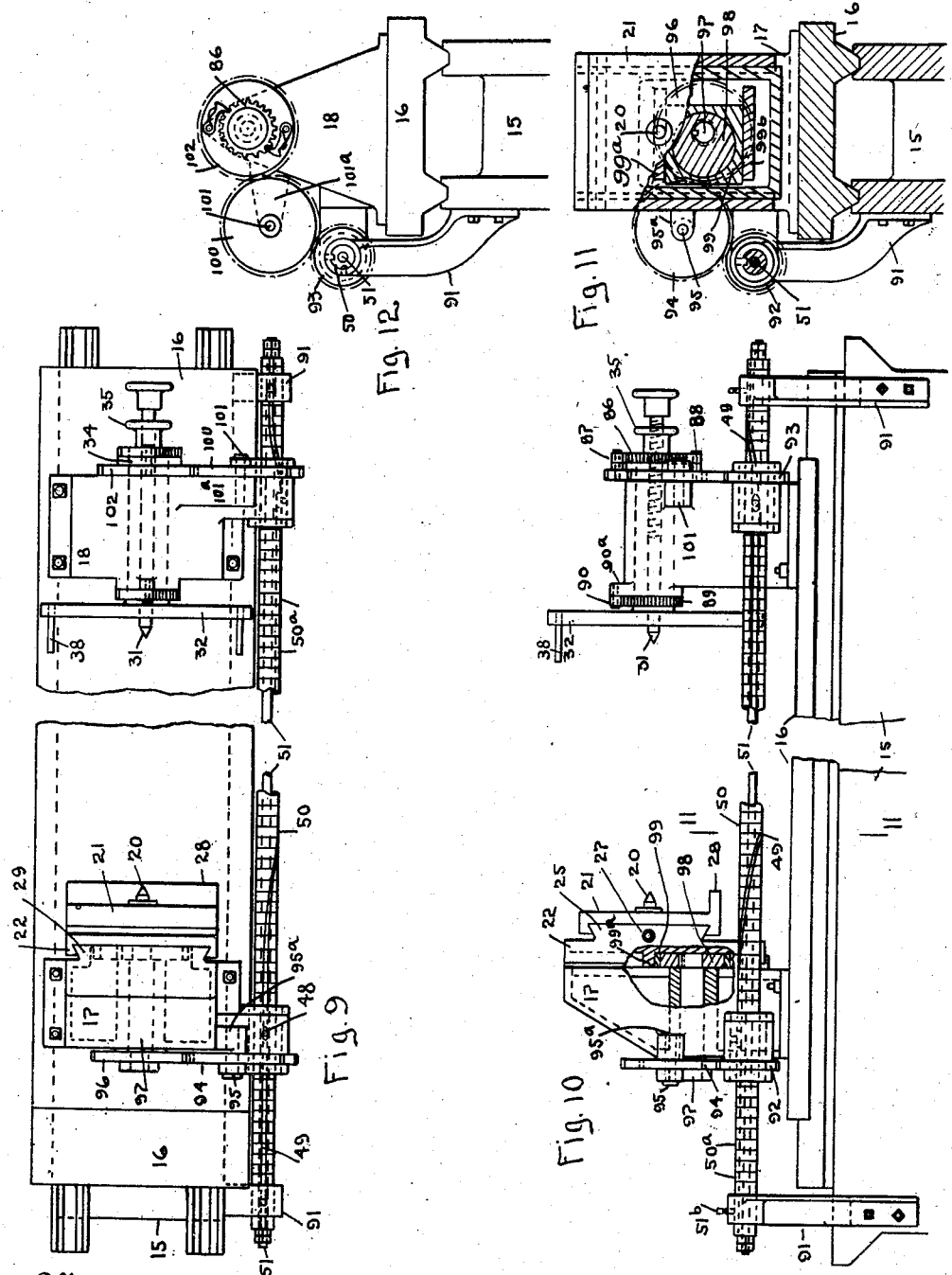
Witnesses:
E. L. Jones
Paul Kiefer
Inventors
Carl Alfred Gustavson
Henry C. Karlson
By H. C. Karlson Attorney

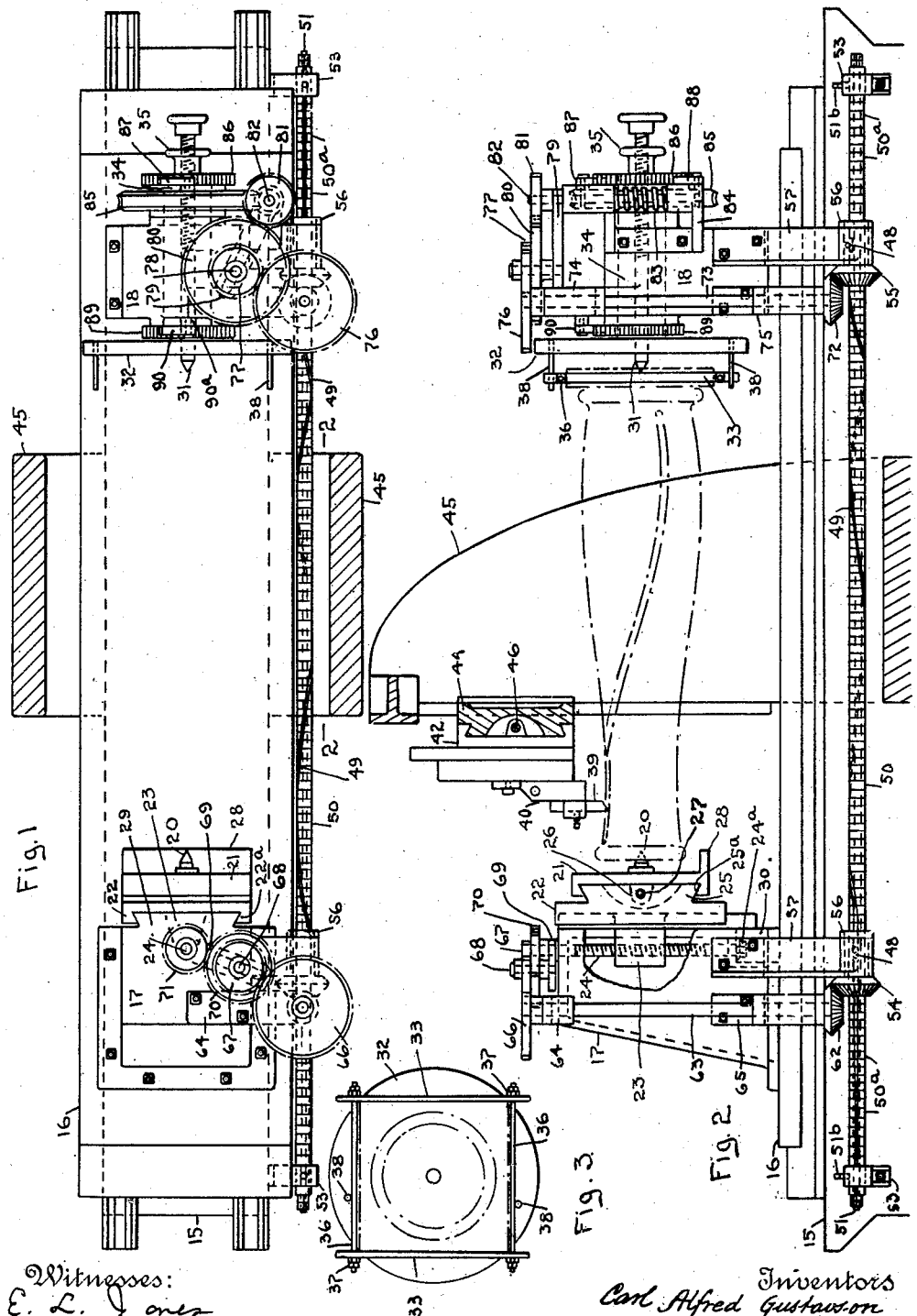

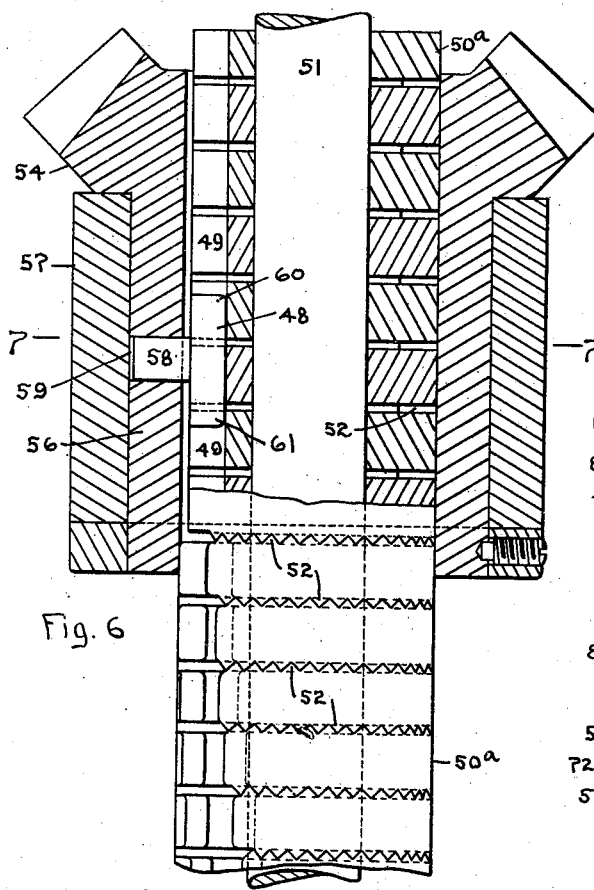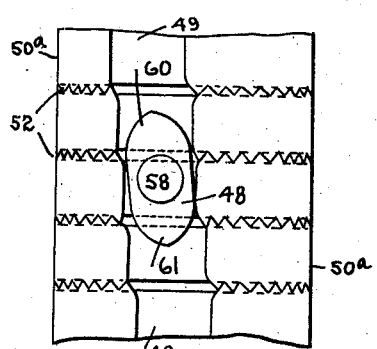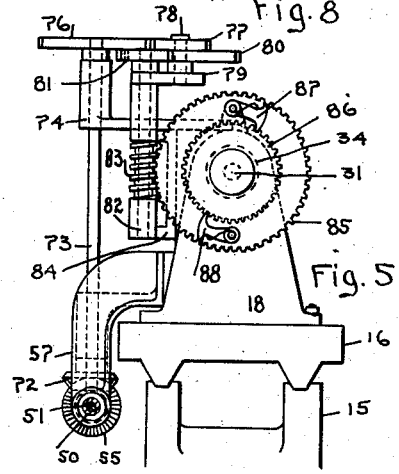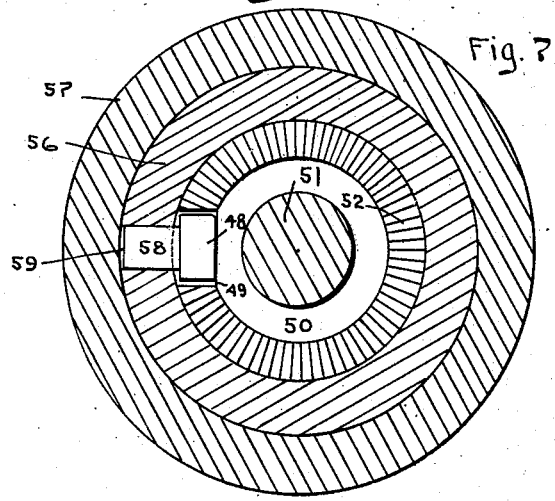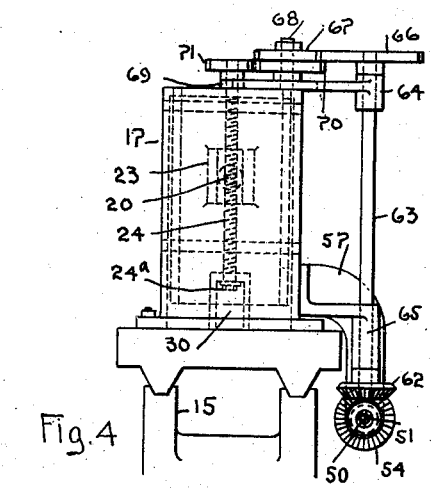

UNITED STATES PATENT OFFICE.

CARL ALFRED GUSTAVSON, OF BROOKLYN, NEW YORK, AND HENRY C. KARLSON, OF HASBROUCK HEIGHTS, NEW JERSEY; SAID KARLSON ASSIGNOR TO SAID GUSTAVSON.

COMBINED ROTATING AND RECIPROCABLE TOOL.

994,386. Specification of Letters Patent. Patented June 6, 1911.

Application filed June 14, 1909. Serial No. 501,998.

*To all whom it may concern:*

Be it known that we, CARL ALFRED GUSTAVSON and HENRY C. KARLSON, citizens of the United States, and residents, respectively, of the borough of Brooklyn, in the county of Kings and State of New York, and of Hasbrouck Heights, in the county of Bergen and State of New Jersey, have invented certain new and useful Improvements in a Combined Rotating and Reciprocable Tool, of which the following is a specification.

This invention relates to a combined rotating and reciprocating tool.

It aims to produce a machine in which the object operated upon is simultaneously reciprocated and rotated and which also variously changes the location of the longitudinal axis of said object.

The invention is particularly adapted to form sinuous grooves in the surface of an object of variable cross sections as a column with a tapering, or curved generatrix. It also provides adjustable means for cutting grooves of different curvatures on the object operated upon.

Referring to the drawings hereto annexed, Figure 1 is a plan view of a machine embodying the invention some of its parts and the object operated upon being omitted, Fig. 2 is a partial front view and section of Fig. 1 on the line 2—2 thereof, Fig. 3 is a side view of a clamping device of the invention, Fig. 4 is a left-hand side view of Fig. 2, Fig. 5 is a right-hand side view of Fig. 2, Fig. 6 is an enlarged axial sectional detail view of the gear-actuating mechanism of the invention, Fig. 7 is a section on the line 7—7 of Fig. 6, Fig. 8 is a fragmentary plan view of a guide bar of the device shown with a shoe in position, Fig. 9 is a fragmentary plan view of a modification of the invention, Fig. 10 is a front elevation of Fig. 9, Fig. 11 is a right hand section on line 11—11 of Fig. 10 and Fig. 12 is a right hand end view of Fig. 10.

The numeral 15 represents the bed of a planer, with a reciprocable table 16 thereon. Stands 17 and 18 extend up from table 16, and will hereafter be referred to, respectively, as the head-stand and the base-stand. The said stands support the object operated upon at proper elevation and are provided with means to adjustably keep the said object in proper relation to the cutting tool.

The head-stand 17 is suitably flanged and bolted to the table 16 and is provided with means for rotatably supporting the said object and to move it to and from the cutting tool. A supporting center 20 is secured to a slide 21, which engages a dovetail projection 25 on a slide 22, by means of a correspondingly dovetailed recess 25$^a$. A lateral movement of the slide 21, which supports the end of the object centered therein, is imparted to the said slide by means of a lug 26, that enters a suitable recess in the projection 25. The said lug is in threaded engagement with the screw 27 that is maintained in position in the slide 21. The said slide 21 has formed at the lower portion thereof a ledge 28, which is utilized for propping up the object or work by means of blocks and wedges when centering the same. The slide 22 has a suitably dovetailed recess 22$^a$ which is in engagement with a corresponding dovetailed member 29, formed integral with the side walls of the said head-stand. The latter is hollow and is entered by the lug 23, which is threaded internally to receive the screw 24. The bearings for the said screw 24 are placed to keep it in an upright position, with its upper end projecting above the head-stand and with the lower end thereof entering a pocket 30 formed in the bottom of the said stand 17. The lower end of the screw 24 is provided with a retaining nut 24$^a$. The slide 22 is locked by the screw 24 except when motion is imparted to the same by the gearing hereinafter mentioned.

The base-stand 18, Figs. 1, 2 and 5, is flanged at the bottom thereof and is bolted to the table 16. The latter stand contains means for supporting and rotating the end of the work, in proper relation to the head supporting and adjusting stand. The latter means comprise a supporting center screw 31, a face plate 32, a dog 33 and gearing connected therewith. The supporting center screw 31 has its threaded portion in engagement with the base-stand 18, and its tip end supports the work or object (Fig. 2). The face plate 32 has extending therefrom a spindle 34 which is journaled in the base-stand 18. The spindle 34 is traversed by the supporting screw 31, the latter being in threaded engagement with the said spindle and it is locked in position, by means of a jam-nut 35. The dog 33 when used on a square base as shown, comprises a pair of flat bars (33) which are joined by cross rods 36. Nuts 37 tighten the bars in place, Figs. 2 and 3. When the dog is used on a round base, the clamping members are suitably curved. The said dog 33 is adapted to be engaged by two or more fingers 38, projecting from the face-plate, and a flexible connection is hereby provided between the face-plate and the end of the work clamped by the dog 33. The said connection rotates the work when the axis is in line or at an angle thereto.

A cutting tool 39 is provided for cutting grooves in the surface of the work. The said cutting tool is clamped in a block 40, that is secured to a tool-carrier 42, which is mounted on a cross-rail 44, transversely mounted on the uprights 45. A screw 46 moves the tool-carrier 40 along the cross-rail 44 to shift the tool laterally. This construction is suitable for a planer provided with said improvement; for a milling-machine embodying like improvements. a rotary cutter would be employed instead of the stationary tool 39.

Motion is imparted to the elevating and to the work-rotating mechanism, by means of a shuttle-shaped shoe 48, Figs. 6, 7 and 8, that is actuated by the reciprocation of the table 16. The said shoe 48 is lodged in an adjustable groove 49, which is laid out in the collar guide bar 50. The said guide bar is composed of collars 50ª which are mounted on a rod 51. The adjoining sides of the said collars are formed with teeth or serrations 52, which upon being pressed and clamped together engage with one another and become interlocked, constituting one rigid bar with said rod 51. The collar guide bar 50 is located alongside the bed 15 of the machine. In the construction represented in Figs. 1 and 2, the said collar guide bar and the rod thereof are held horizontally at the side of the bed 15, below the reciprocating table 16, by depending brackets 53, and are maintained in position by means of set-screws 51ᵇ. The groove 49 is formed by the registration of the notches in the faces of the collars 50ª. The serrations on the opposite sides of the collars permit the said notches to be off-set at various distances from one another so that the notches will form one continuous groove or pathway. The curvature of said groove by reason of the means of variably locating each collar can be made to assume any desirable direction. The shoes 48 engaged in the said groove are carried in the hub extensions 56 of the beveled-gears 54 and 55. The said hub extensions are revolubly mounted in brackets 57 that are secured to the head and base-stands respectively 17 and 18. Each of the said shoes has a cylindrical shank 58 which pivotally engages a correspondingly shaped hole 59 in the hub extension of the respective gears 54 or 55. The heads of the said shoes are pointed at both ends 60 and 61 and pass successively through the said notches in both directions. The beveled gears 54 and 55 are caused to rotate in one direction or in a direction opposite thereto when the table is reciprocated, and will turn more or less rapidly in proportion to sinuosity of the groove 49. The bevel gear 54 meshes with a gear 62 that is secured to the lower end of a vertical shaft 63 which is journaled in the brackets 64, 65, that project outwardly from the said head-stand 17. The shaft 63 carries at its upper end a gear 66 which is in engagement with a pinion 67 that is rotatably mounted on a stud 68, and the said stud is secured in a slotted arm 69. A large gear wheel 70 is similarly mounted on the said stud 68 and is suitably arranged to rotate with the pinion 67, the said gear 70 meshes with a pinion 71 that is secured to the upper end of the screw 24 that is in threaded engagement with the lug 23 on the slide 22. The coacting parts connected with the slide 22 have been previously described. The rotary motion of the gear 54, is caused by the action of the groove 49 on the shoe 48 consequent to the reciprocation of the table 16. The said rotation of the gear 54 is transmitted to the above referred to train of gears and the raising and lowering of the end of the work adjacent to the head-stand 17 is governed by the curvature of the groove and the relation of the gears in the said train. The slot in the arm 69 provides for the shifting and adjustment of the stud 68, to accommodate various combinations of gears, as may be required by the diameter of the object operated upon, or the pitch of the groove traced therein, or the speed with which it is desired to turn out the work. The bevel-gear 55 gears with a gear 72 which latter is secured on the lower end of an upright shaft 73, that is journaled in the brackets 74, 75, extending outwardly from the base-stand 18. At the upper end of the shaft 73 is fastened a gear 76, the teeth of which mesh with the teeth of a pinion 77, that is journaled on the upper end of a stud 78, secured in a slotted arm 79, similar to the arm 60 and provided for a like purpose. On the stud 78 is also journaled a gear 80, which is locked with the pinion 77. The teeth of gear 80 mesh with the teeth of a pinion 81, that is secured to the upper end of a vertical shaft 82, that carries a worm 83. The said shaft 82 is journaled in a bracket 84 which is attached to the side of the base-stand 18. The worm 83 engages a worm-wheel 85 that is loosely mounted on the aforesaid spindle 34, and confined between the rear end of said base-stand and a ratchet-wheel 86, that is rigidly secured to the spindle 34. Spring-pressed pawls 87 and 88 are pivoted to the outer side of said worm-wheel and are reversibly engaged with opposite sides of said ratchet-wheel. The latter transmit motion from the worm-wheel 88 to the ratchet wheel 86 in a predetermined direction. Another ratchet-wheel 89, is secured to the spindle 34, at the end thereof adjoining the face-plate 32. The ratchet-wheel 89 is engaged by a reversible pawl 90, pivotally attached to an ear 90ª formed in the upper portion of the base-stand 18 and adjusted to slide over the teeth of its coacting ratchet wheel 89. The nature of the operation of the pawls is such that the rear pawls 87 and 88 always work together in one direction or the other, according to which way they are turned, and the forward pawl 90 is set likewise to check back rotation. The train of gears 76, 77, 80 and 81 rotate with the bevel gear 55 and through the interposed elements rotate the face plate 32 which rotates the work or object operated upon with the spindle 34, also the dog 33 and the end of the work on which it is clamped, in the same ratio and with a predetermined velocity of rotation dependent upon the sinuosity of the groove 49 in the collar guide bar 50. The said reversible pawls 87 and 88 enable the operator to cause the work to rotate in the direction desired, so that the said work 19, can be grooved or fluted in either direction.

The trains of gears 76, 77, 80 and 81 comprising the actuating mechanism for the stands 17 and 18 can be varied to suit the raising, lowering and turning of the work, and the grooves traced thereon, as well as by changing the pitch of the groove in the said collar guide bar 50. The face-plate 32, spindle 34 and their appurtenances are locked by the worm 83 except when motion is imparted to the latter by means of the said train of gears.

The modification illustrated in Figs. 9 to 12, inclusive, relates to the employment of means equivalent to those hereinbefore described for raising and lowering and for rotating the work. Parts of the machine not here specifically referred to, are identical with the parts already described, and therefore are designated by the same numerals. In the modification the guide bar 50 is mounted above instead of below the reciprocating table 16. In mounting the guide bar 50 above the table 16, brackets 91 are used, which are bolted to the side of the bed 15, and extend the requisite distance above the said table. By mounting the guide bar 50 above the table a simple arrangement of spur-gears is obtained in place of the more elaborate gearing shown in the construction above. Spur-wheels 92 and 93 replace the bevel-gears 54, 62 and 72 on the hubs 56. The spur-gear 92 meshes with a larger spur-gear 94 which is mounted on a stud 95 that is secured in a lug 95ª formed on the side of the head-stand 17. The said spur-gear 94 is in gear with a similar spur-gear 96 that is secured to the outer end of a horizontal shaft 97, which latter is journaled in the head-stand 17 and carries an eccentric 98 on the inner end thereof. The said eccentric is fitted in a block 99, slidingly mounted between the ledges 99ª and 99ᵇ projecting inwardly from the vertical slide 22 and operates the said slide and therewith connected parts. The spur-gear 93 is made to engage a larger spur-gear 100 which is mounted on a stud 101 that is secured on a lug 101ª formed on the side of the base-stand 18. The said gear 18 meshes with a similar spur-gear 102 journaled on the outer end of the spindle 34 of the face-plate 32, which, as before described, is provided with the fingers 38, adapted to slidably engage the dog 33 that is clamped to the base of the column 19.

Having described our invention what we desire to secure by Letters Patent and claim is:

1. In a machine of the character described, the combination of an element to reciprocate an object to be operated upon, a cutting tool in the machine in the path of said object, a guide bar with adjustable elements secured to the machine, other elements in engagement with said guide bar, gearing actuated by said last named elements and devices controlled thereby which locate the object operated upon in proper position for said cutting tool to cut various grooves on an object of varying diameter.

2. In a machine of the character described the combination of a reciprocating table, supports for an object operated upon above said table, a cutter in the machine located in the path of said object, means connected with said supports to translate and rotate said object, notched collars constituting a guide bar adjacent to said table, a shoe in engagement with said guide bar, a train of gearing coacting with said shoe and with one of said supports.

3. In a machine of the character described the combination of a reciprocating table, a cutting tool in the machine in the path of an object to be operated upon, an adjustable element constituting a guide bar adjacent to said table, a pair of shoes in said guide bar, two trains of gears on the machine, one train actuated by one of said shoes and the other train actuated by the other shoe, a support for the object operated upon connected up with each of said trains of gears to transmit translation to one of said supports and rotation to the other.

4. In a machine of the character described the combination of a reciprocating table, a cutting tool mounted in the path of an object to be operated upon, a stationary rod adjacent to the table, a series of collars mounted on said rod having serrations or teeth formed on their sides adapted to interlockingly clamp with one another and forming with said rod a rigid guide bar, a pair of shoes engaging said grooved guide bar, a train of gears in the machine actuated by each of said shoes, a support for each end of the object operated upon connected up with each of said train of gears to transmit translation to one of said supports and rotation to the other support.

5. In a machine of the character described the combination of a reciprocating table, a cutting tool mounted in the machine in the path of an object operated upon, a guide bar comprising interlocking collars and having notches in the peripheral faces of said collars, said collars adapted to register with one another to form an adjustable groove, a rod to support said collars secured in the machine adjacent to said reciprocating table, a pair of shoes engaging the groove formed with said guide bar, trains of gears in the machine actuated by said shoes, supports for the ends of the object operated upon connected with said trains to transmit motion to the object operated upon.

6. In a machine of the character described the combination of a reciprocating table, a cutting tool mounted in the path of an object operated upon, a grooved guide bar comprising notched collars adapted to interlockingly register with one another to form a rigidly grooved guide bar alongside of said reciprocating table, a pair of shuttle shaped shoes engaging the grooved guide bar, gears actuated by said shoes, other gearing in the machine actuated by said gears, supports for the ends of the object operated upon connected up with said gearing to transmit motion to said supports.

7. In a machine of the character described the combination of a reciprocating table, a cutter in the machine in the path of an object operated upon, a grooved guide bar located adjacent to said reciprocating table, means to adjustably vary the groove of said guide bar, an element engaging said groove, a train of gears in the machine actuated by said element, supports for the ends of the object operated upon extending up from said reciprocating table, a supporting center for said object connected with one of said supports, a supporting center screw connected with the other support, a horizontal laterally adjustable slide over said supporting center, a vertical slide carrying said horizontal slide, means to maintain the latter in operative position and means to transmit translation to said vertical slide connected up with said train of gears.

8. In a machine of the character described the combination of a reciprocating table, a cutter mounted in the path of an object operated upon, a grooved guide bar located adjacent to said reciprocating table, means to adjustably vary the sinuosity of the groove in said guide bar, a shuttle shaped shoe engaging said groove, supporting stands for the ends of the object operated upon extending up from said reciprocating table, a supporting center for one end of said object connected with one of said stands, a supporting center screw for the other end, coacting slides for said supporting center, a screw adapted to raise and lower said supporting center, a train of gears in the machine actuated by said shoe and connected up with said supporting center screw to translate the object operated upon.

9. In a machine of the character described the combination of a reciprocating table, a cutting tool located in the machine in the path of an object operated upon, a grooved guide bar located adjacent to said reciprocating table, means to adjustably vary the curvature of said groove, an element engaging said groove, supports for the object operated upon, a supporting center on one of said supports, a supporting center screw on the other support, a spindle for said center screw journaled in one of said supports, said center screw maintained in threaded engagement with said spindle, a face plate, ratchet wheel with pawl for one end of said spindle, a ratchet wheel for the other end of said spindle, pawls engaging the latter ratchet wheel, a gear mounted on the spindle adjacent to the latter ratchet wheel, a train of gears in the machine actuated by said groove engaging element to rotate the object operated upon.

10. In a machine of the character described the combination of a reciprocating table, a cutting tool mounted in the machine in the path of an object operated upon, a guide bar with a groove of adjustable curvature located adjacent to said reciprocating table, a shuttle shaped shoe engaging said groove, supporting stands for the ends of the object operated upon extending up from the reciprocating table, a supporting center for one end of said object connected with one of said stands, a supporting center screw for the other end of the object connected with the other stand, a spindle for said center screw journaled in one of said supporting stands in threaded engagement with said center screw, a face plate for one end of said spindle, a ratchet wheel on each end of said spindle, a pawl pivoted in one of the stands in engagement with one of said ratchet wheels, a worm gear loosely mounted on said spindle adjacent to the other ratchet wheel, pawls pivotally carried by said worm gear adapted to engage the latter ratchet wheel, a worm engaging said worm gear, a train of gears in the machine actuated by said groove engaging shoe and connected up with said worm to rotate the object operated on to enable the said cutting tool to cut sinuous grooves thereon.

11. In a machine of the character described the combination of a reciprocating table, a cutting tool mounted in the machine in the path of an object operated upon, a guide bar with a groove of adjustable curvature located adjacent to said reciprocating table, a shuttle shaped shoe engaging said groove, supporting stands extending up from the said reciprocating table, a spindle journaled in one of said supporting stands, a face plate for one end of said spindle, a ratchet wheel for said spindle located adjacent to said face-plate, a reversible pawl pivotally carried on said stand adapted to check reverse rotation of said ratchet wheel, a second ratchet wheel for the other end of said spindle, a gear loosely mounted on said spindle adjacent to said second ratchet wheel, reversible pawls pivotally carried on said gear adapted to rotate the second ratchet wheel and therewith connected elements in a predetermined direction of rotation, a train of gears actuated by said groove engaging shoe with a velocity dependent upon the curvature of the groove in said guide bar, said train of gears connected up with said loosely mounted gear to rotate the object operated upon, to enable the said cutting tool to cut a groove of predetermined character thereon.

12. In a machine of the character described the combination of a reciprocating table, a cutting tool mounted in the machine in the path of an object operated upon, a guide bar with a groove of adjustable curvature located adjacent to said reciprocating table, a pair of shoes engaging said groove, a head and a base stand for the ends of the object operated on mounted on said reciprocating table, a supporting center for one end of the object operated upon, slides for said supporting center slidably mounted on said head stand, means to maintain said slides in operative position, a supporting center screw in the base stand for the other end of the object operated upon, a spindle in threaded engagement with the center screw journaled in said base stand, a face plate to rotate the object operated upon connected to one end of said spindle, gearing adapted to be actuated in a predetermined direction for the other end of said spindle, a train of gears actuated by each of said shoes, rotating means to transmit translation to the supporting center and rotation to the face plate to enable the said cutting tool to cut grooves of different curvature in objects operated upon of varying diameters.

Signed at the borough of Manhattan in the county of New York and State of New York this 9th day of June A. D. 1909.

CARL ALFRED GUSTAVSON.
HENRY C. KARLSON.

Witnesses:
W. M. BASTABLE,
H. L. VAN ZILE.

---

Copies of this patent may be obtained for five cents each, by addressing the "Commissioner of Patents, Washington, D. C."